United States Patent
Kinoshita et al.

[11] Patent Number: 5,919,881
[45] Date of Patent: Jul. 6, 1999

[54] AGENTS FOR AND METHOD OF REDUCING THE FLUIDITY DROP OF HYDRAULIC CEMENT COMPOSITIONS AND METHOD OF PRODUCING SUCH AGENTS

[75] Inventors: Mitsuo Kinoshita; Yoshimasa Miura; Takeshi Arashima; Tomoo Takahashi; Kazuhide Saito, all of Aichi, Japan

[73] Assignee: Takemoto Yushi Kabushiki Kaisha, Aichi, Japan

[21] Appl. No.: 08/881,047

[22] Filed: Jun. 25, 1997

[30] Foreign Application Priority Data

Jun. 28, 1996 [JP] Japan .................................. 8-188628

[51] Int. Cl.⁶ ...................... C08F 228/02; C08F 222/06; C08K 3/00
[52] U.S. Cl. ...................... 526/287; 526/271; 526/318.2; 526/320; 524/3; 524/5
[58] Field of Search .................................. 526/287, 318.2, 526/320, 271; 524/3, 5

[56] References Cited

U.S. PATENT DOCUMENTS

| | | | |
|---|---|---|---|
| 4,323,363 | 4/1982 | Brachten et al. | 526/287 |
| 4,469,839 | 9/1984 | Maruhashi et al. | 526/287 |
| 5,162,402 | 11/1992 | Ogawa et al. | 526/318 |
| 5,432,212 | 7/1995 | Honda et al. | 524/8 |
| 5,466,289 | 11/1995 | Yonezawa et al. | 524/3 |
| 5,798,425 | 8/1998 | Albrecht et al. | 526/271 |

*Primary Examiner*—Tae Yoon
*Attorney, Agent, or Firm*—Majestic, Parsons, Siebert & Hsue P.C.

[57] ABSTRACT

Water-soluble vinyl copolymers with number average molecular weight 500–20000, having two specified repetition units at a specified molar ratio and a specified end group can serve as an effective agent for reducing a drop in the fluidity of hydraulic cement compositions.

17 Claims, No Drawings

AGENTS FOR AND METHOD OF REDUCING THE FLUIDITY DROP OF HYDRAULIC CEMENT COMPOSITIONS AND METHOD OF PRODUCING SUCH AGENTS

BACKGROUND OF THE INVENTION

This invention relates to agents for reducing the fluidity drop of hydraulic cement compositions (herein simply referred to as "the fluidity drop reducing agents") and methods of producing such agents, as well as methods of reducing the fluidity drop of hydraulic cement compositions. More particularly, this invention relates to agents which are capable of reducing the drop in the fluidity with time (herein referred to as "the slump loss") of hydraulic cement compositions such as cement pastes, cement grouts, mortars and concrete and methods of producing such agents, as well as methods of reducing the fluidity drop of such hydraulic cement compositions.

Many kinds of cement dispersant are being used for improving the fluidity of hydraulic cement compositions. If a cement dispersant is used to prepare a hydraulic cement composition with a highly reduced water content, however, its slump loss becomes too great, giving rise to the problem of poor workability and applicability. In order to reduce the slump loss, therefore, it has been proposed to use a water-soluble vinyl copolymer, which itself has the property of reducing the slump loss, as the cement dispersant. Examples of such water-soluble vinyl copolymer include (1) those obtained by co-polymerizing (meth)acrylates (as disclosed in Japanese Patent Publication Tokkai 1-226757, U.S. Pat. No. 4,962,173, and Japanese Patent Publication Tokkai 4-209613); and (2) copolymers of maleic anhydride and alkenyl ether and their derivatives (as disclosed in Japanese Patent Publications Tokko 58-38380, Tokkai 63-285140 and Tokkai 2-163108 and European Patent Publication 537872). These prior art methods of using such a water-soluble vinyl copolymer as the cement dispersant, however, are not capable of sufficiently reduce the slump loss. In order to further reduce the slump loss, therefore, there have also been proposals to use a so-called fluidity drop reducing agent in addition to a cement dispersant. According to a method of this kind, as disclosed in Japanese Patent Publication Tokko 5-67579, a water-insoluble copolymer obtained from maleic anhydride and olefin is used together with a cement dispersant, and the slump loss is reduced by making use of the property of this water-insoluble copolymer to undergo hydrolysis by a basic hydroxide generated by the hydration reaction of the cement and to thereby gradually become a water-soluble copolymer. This prior art method of using a fluidity drop reducing agent together with a cement dispersant, however, is not advantageous because the ability to reduce the slump loss varies and becomes weaker with time and also because the setting retardation is large.

SUMMARY OF THE INVENTION

It is therefore an object of this invention to overcome the problems of prior art technology using as the cement dispersant a water-soluble vinyl copolymer which itself has the property of reducing the slump loss or using a prior art fluidity drop reducing agent together with a cement dispersant.

The present invention is based on the discovery by the present inventors as a result of their diligent investigations in view of the aforementioned object that use as the fluidity drop reducing agent be made of water-soluble vinyl copolymers with number average molecular weight 500–20000 having two specified repetition units at a specified ratio and a specified end group in the molecule.

DETAILED DESCRIPTION OF THE INVENTION

A fluidity drop reducing agent embodying this invention is characterized as comprising water-soluble vinyl copolymers of number average molecular weight 500–20000 with molecules containing a first repetition unit and a second repetition unit shown respectively by Formulas 1 and 2 given below at a molar ratio of 3/2–2/3 and having as end group a hydrocarbon group substituted by sulfonate group:

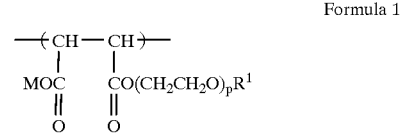

Formula 1

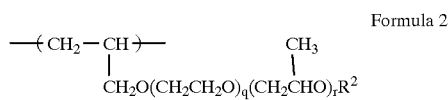

Formula 2 where $R^1$ is alkyl group with 1–3 carbon atoms, phenyl group or benzyl group, $R^2$ is H or $CH_3$, p is an integer 1-50, q is an integer 1-50, r is an integer 1-25, and M is hydrogen, alkali metal, alkali earth metal, ammonium or organic amine or a base.

Water-soluble vinyl copolymer, which comprises a fluidity drop reducing agent according to this invention, contains the first and second repetition units respectively shown by Formulas 1 and 2 at molar ratio of 3/2–2/3, and more preferably 11/9–9/11. Each of the repetition units may be a random combination or a block combination. The molecule of this water-soluble vinyl copolymer has as its end group a hydrocarbon group substituted by sulfonate group. Such an end group may be only on one side of the copolymer formed by the first and second repetition units shown by Formulas 1 and 2 or on both sides. As will be described below, such an end group can be formed by radical addition or radical addition polymerization of monoethylenically unsaturated hydrocarbon monomer substituted by sulfonate group to a copolymer formed with the first and second repetition units shown by Formulas 1 and 2. The number average molecular weight of these water-soluble vinyl copolymers (hereinafter always pullulan converted by GPC method) should be 500–20000, and preferably 1000–10000. The repetition numbers of the first and second repetition units shown respectively by Formulas 1 and 2 in the water-soluble vinyl copolymer, their total and their ratios to the end group may be appropriately selected corresponding to the aforementioned number average molecular weight, but the total of both repetition units is preferably over 60 weight % of the total and more preferably over 80 weight %.

The first and second repetition units shown respectively by Formulas 1 and 2 may each be formed by copolymerizing corresponding vinyl monomers. Examples of the vinyl monomers for forming the first repetition unit shown by Formula 1 include those with the repetition number of oxyethylene units 1–50 such as (1) alkoxy polyethoxyethyl monomaleate with 1–3 carbon atoms, (2) phenoxy polyethoxyethyl monomaleate, (3) benzyloxy polyethoxyethyl monomaleate, and (4) salts of aforementioned (1)–(3). Examples of metals and compounds of aforementioned M for forming the salts of aforementioned (4) include (a) alkali metals such as sodium and potassium, (b) alkali earth metals such as calcium and magnesium, (c) ammonium, and (d) organic amines such as diethanol amine and triethanol amine. Of the above, alkali metal salts of alkoxy polyethoxyethyl monomaleate with 1–3 carbon atoms and alkali metal salts of phenoxy polyethoxyethyl monomaleate, both with the repetition number of oxyethylene units 3–30, are preferred. Examples of the vinyl monomers for forming the second repetition unit shown by Formula 2 include those with repetition number of oxyethylene units 1-50 and repetition number of oxypropylene units 1-25 such as (1) polypropoxy polyethoxyethyl monoallyl ethers, and (2) methoxy polypropoxy polyethoxyethyl allyl ethers. Particularly preferable among these are polypropoxy polyethoxyethyl monoallyl ethers with the repetition number of oxyethylene units 10–45 and that of oxypropylene units 2–15.

Examples of hydrocarbon group substituted by sulfonate group which becomes an end group of the water-soluble vinyl copolymer include (1) substituted alkenyl groups obtained by radical addition of monoethylenically unsaturated hydrocarbon monomers substituted by sulfonate group, and (2) substituted polyalkenyl groups obtained by radical addition polymerization of monoethylenically unsaturated hydrocarbon monomers substituted by sulfonate group. Preferable among these are: (a) substituted alkenyl groups obtained by radical addition of allyl sulfonates or methallyl sulfonates, (b) substituted alkenyl groups obtained by radical addition of vinyl sulfonates, isopropenyl sulfonates, styrene sulfonates or isopropenyl benzene sulfonates, (c) substituted polyalkenyl groups obtained by radical addition polymerization of one kind of salts shown above in (b), and (d) substituted polyalkenyl groups obtained by radical addition polymerization of two or more kinds of salts shown above in (c). Examples of bases for forming the sulfonates in all of these examples include alkali metals, alkali earth metals, ammonium and alkanol amine, as mentioned above regarding Formula 1, but alkali metals are particularly preferable.

This invention does not impose any particular limitations regarding the content of the hydrocarbon groups substituted by sulfonate group serving as an end group of the water-soluble vinyl copolymer, but it is usually (1) 1–2 moles in the case of substituted alkenyl groups obtained by radical addition and (2) 3–4 moles in the case of substituted polyalkenyl groups obtained by radical addition polymerization (both per one molecule of the water-soluble vinyl copolymer).

The water-soluble vinyl copolymers serving as a fluidity drop reducing agent according to this invention may be produced by different methods, but it is advantageous to go through the following first, second and third steps.

In the first step, first vinyl monomers and second vinyl monomers shown respectively by Formulas 3 and 4 given below are copolymerized at a molar ratio of 3/2–2/3 in the presence of a radical initiator, and a so-called radical termination process is carried out thereafter to eliminate the radicals generated by the radical polymerization process and to obtain a "radically terminated copolymer".

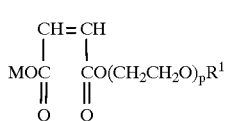

Formula 3

Formula 4 where $R^1$, $R^2$, p, q, r and M are as defined above with reference to Formulas 1 and 2.

In the second process, a radical initiator is added to a system containing this radically terminated copolymer to carry out a so-called radical activation process to obtain a radically activated copolymer. In the third step, radical addition or radical addition polymerization of monoethylenically unsaturated hydrocarbon monomers substituted by sulfonate group is carried out to the radically activated copolymer and water-soluble vinyl copolymers with number average molecular weight 500–20000, having hydrocarbon groups substituted by sulfonate group as end groups are obtained.

In the first step, first vinyl monomers and second vinyl monomers shown respectively by Formulas 3 and 4 given above are copolymerized at a molar ratio of 3/2–2/3, and more preferably 11/9–9/11 in the presence of a radical initiator. In this step, vinyl monomers shown by Formula 3 are those which form the repetition unit shown by Formula 1, and vinyl monomers shown by Formula 4 are those which form the repetition unit shown by Formula 2. The vinyl monomers shown by Formulas 3 and 4 can be copolymerized by aqueous solution polymerization using water or a mixed solvent with water and a water-soluble organic solvent. Any radical initiator which generates radicals by decomposing at the reaction temperature of copolymerization may be used for the copolymerization reaction of either of the vinyl monomers, but the use of a water-soluble radical initiator is preferred.

Examples of such water-soluble radical initiator include persulfates such as potassium persulfate and ammonium persulfate, hydrogen peroxide, and 2,2-azobis (2-amidinopropane) dihydrochloride. They may be combined with a reducing agent such as a sulfite and L-ascorbic acid or amines to be used as a redox initiator. Use may also be made of a cerium salt catalyst as a strong oxidizing agent such as cerium (IV) diammonium nitrate and cerium (IV) tetra ammonium sulfate. The amount of such a water-soluble radical initiator to be used depends on its kind and the kind of the vinyl monomers used for the copolymerization. In the case of using ammonium persulfate, for example, it is preferable to use at a rate of 0.2–3 weight % with respect to the total of the vinyl monomers shown by Formulas 3 and 4.

In the first step, radical termination is carried out in the reacting system for radical copolymerization of aforementioned vinyl monomers to obtain radically terminated copolymers. Roughly speaking, there are two methods to carry out radical termination, one being to continue the reaction until the radicals disappear from the reacting system completely such that the radical copolymerization reaction substantially stops, and the other being to add a radical terminator into the reacting system to forcibly inactivate the radicals.

Prior art radical terminators of known types may be used but examples of preferred radical terminators which can be used advantageously include (1) compounds having at least two hydroxy or thiol groups in the molecule such as 2-mercaptoethanol, 3-mercapto-1,2-propanediol, dithioerythritol, and 1,2-ethanediol, and (2) compounds having thiol groups and α,β-unsaturated hydrocarbon groups in the molecule, including mercaptoalkyl α,β-ethylenically unsaturated monocarboxylates such as mercaptoethyl (meth) acrylate and mercaptoethyl crotonates. The use of such compounds as radical terminator is advantageous because radically active points can be provided to the ends of the obtained radically terminated copolymer when a radical initiator is added in the second step, as will be described below, such that the radical addition and radical addition polymerization of monoethylenically unsaturated hydrocarbon monomers substituted by sulfonate group can be carried out more effectively and selectively in the third step, as will also be described below.

The primary purpose of adding a radical terminator in the first step is to stop the copolymerization reaction, but it is also for making it possible to control the molecular weight of the radically terminated copolymer. For this purpose, the addition of the radically terminator may be carried out either all at once at a specified point in time during the copolymerization reaction or at separate points in time. For the purpose of controlling the molecular weight, the present invention does not impose any limitation on the use of a known type of chain transfer agent such as mercaptoacetic acid, in addition to a radical terminator. An appropriate amount of radical terminator to be added is determined according to the molecular weight of the radically terminated copolymer and the kinds of the vinyl monomers, aqueous solvent and the radical terminator, but it is usually 1–50 molar % of the total of the vinyl monomers shown by Formulas 3 and 4 which will form the radically terminated copolymer.

Known methods may be used for the aqueous solution radical polymerization using the vinyl monomers shown by Formulas 3 and 4. The present invention does not impose any particular limitation on the method or timing of introducing the vinyl monomers into the copolymerization reaction system. The vinyl monomers may be entirely introduced into the copolymerization reaction system prior to the starting of the copolymerization reaction or may be introduced in parts into the copolymerization reaction system. The copolymerization reaction may be carried out at room temperature or as high as the boiling point of the aqueous solvent, but the preferred reaction temperature is 50–80° C. If the aforementioned redox initiator is used as the radical initiator, the copolymerization reaction temperature may be reduced from the aforementioned range by 10–30° C.

In the aforementioned second step, a radical initiator is added to the system obtained in the first step containing the radically terminated copolymer in order to carry out radical activation of this copolymer. If no vinyl monomers which have not reacted remain in the reaction liquid obtained in the first step, this reaction liquid may be used directly in the second step. If some vinyl monomers which have not reacted still remain in the reaction liquid, however, the radically terminated copolymers are separated from the reaction liquid, and the copolymers thus separated are utilized in the second step. A radical initiator similar to the one used in the first step may be used in the second step.

In the case of a radically terminated copolymer obtained in the first step by radical termination without using a radical terminator, it is advantageous to add an azobis compound with hydroxyl group in the molecule as a radical initiator such that radical addition or radical addition polymerization of monoethylenically unsaturated hydrocarbon monomer substituted by sulfonate group used subsequently in the third step can be carried out effectively and selectively. The invention does not limit the use of such azobis compound against the radically terminated copolymer obtained in the first step by using a radical terminator. Examples of azobis compound having hydroxyl group in the molecule include 2–2'-azobis(2-methyl-N-(2-hydroxyethyl) propionamide), 2,2'-azobis(2-methyl-N-(1,1-bis (hydroxymethyl) ethyl) propionamide), and 2,2'-azobis(2-methyl-N-(1,1-bis (hydroxymethyl)-2-hydroxyethyl) propionamide).

The amount of the radical initiator to be used in the second step depends on the kind of the radical initiator and the kind of monoethylenically unsaturated hydrocarbon monomer substituted by sulfonate group used in the third step, but it is normally 0.1–5 weight % of the radically terminated copolymer obtained in the first step.

In the third step, water-soluble vinyl copolymers having hydrocarbon group substituted by sulfonate group as end group are obtained by radical addition or radical addition polymerization of monoethylenically unsaturated hydrocarbon monomer substituted by sulfonate group to the copolymer which was radically activated in the second step.

This invention does not particularly limit the monoethylenically unsaturated hydrocarbon monomer substituted by sulfonate group which is used for radical addition or radical addition polymerization of radically activated copolymer. Examples thereof include: (1) monomers principally adapted for radical addition such as allyl sulfonates and methallyl sulfonates, and (2) monomers adapted for radical addition or radical addition polymerization such as vinyl sulfonates, isopropenyl sulfonates, styrene sulfonates and isopropenyl benzene sulfonates. Examples of bases for forming the aforementioned salts (1) and (2) include alkali metals, alkali earth metals, ammonium and alkanol amines as described above with reference to Formula 1, but alkali metals are particularly preferred.

The ratio between the radically activated copolymer and the monoethylenically unsaturated hydrocarbon monomer substituted by sulfonate group depends on the kind of the radical terminator used in the first step and the kind of the radical initiator used in the second step, for example, whether or not an azobis compound having hydroxyl group in the molecule has been used, but it is usually 1–10 moles, or preferably 1.5–5 moles for one mole of radically activated copolymer. Radical addition or radical addition polymerization of radically activated copolymers and monoethylenically unsaturated hydrocarbon monomers substituted by sulfonate group may be carried out by any known prior art method.

By the radical addition or radical addition polymerization of monoethylenically unsaturated hydrocarbon monomers substituted by sulfonate group to the radically activated copolymers obtained in the second step, radically activated copolymers with one molecule radically added or several molecules which are radical addition polymerized at each end radical active point are obtained. Water-soluble vinyl copolymers with controlled end structure can be obtained according to this invention because the monoethylenically unsaturated hydrocarbon monomers substituted by sulfonate group which are used according to this invention have much higher reaction selectivity than other kinds of sulfonates of vinyl monomers like (meth)acryloxy sulfonates such as 2-(meth)acryloxyethyl sulfonate and (meth)acrylamide sulfonates such as 2-acrylamide-2-methylpropane sulfonate which contain sulfonate groups but are not a monoethylenically unsaturated hydrocarbon monomer.

Next will be described a method of reducing the fluidity drop of a hydraulic cement composition by using a fluidity drop reducing agent comprising water-soluble vinyl copolymers as described above. This method comprises the step of adding to a hydraulic composition containing cement, an aggregate, a cement dispersant and water-soluble vinyl copolymers with number average molecular weight 500–20000 having within the molecule repetition units shown by Formulas 1 and 2 shown above at a molar ratio of 3/2–2/3 and a hydrocarbon group substituted by sulfonate group as end group.

According to the method of this invention, the vinyl monomers to be added to a hydraulic cement composition as fluidity drop reducing agent can be obtained by radical addition or radical addition polymerization of monoethylenically unsaturated hydrocarbon monomers substituted by sulfonate group to copolymers obtained by polymerization of vinyl monomers shown by Formulas 3 and 4 given above at a molar ratio of 3/2–2/3.

Examples of cement for the hydraulic cement composition include not only portland cement such as normal cement, high early strength portland cement, ultra-high early portland cement and moderate heat portland cement, but also blend cement such as blast furnace slag cement, fly ash cement and silica cement. Examples of aggregate include fine aggregates such as river sand, pit sand and sea sand, and coarse aggregates such as river gravel, crushed stone and light-weight aggregates. Examples of cement dispersant which comprises the hydraulic cement composition include (meth)acrylate based water-soluble vinyl copolymers, naphthalene sulfonic acid formaldehyde condensates, melamine sulfonic acid formaldehyde condensates, aminophenol sulfonic acid formaldehyde condensates, lignin sulfonic acids, hydroxy carboxylic acids and their salts. Of these, however, (meth)acrylate based water-soluble vinyl copolymers are preferable.

Such (meth)acrylate based water-soluble vinyl copolymers can be obtained by copolymerization of (meth)acrylic acid or its salt and one or more kinds of vinyl monomers which are copolymerizable therewith. Examples of copolymerizable vinyl monomer include alkoxy polyethoxy ethyl (meth)acrylate, alkyl (meth)acrylate, hydroxy alkyl (meth) acrylate, polyethoxyethyl mono(meth)allyl ether, (meth) allyl sulfonates, and p-(meth)allyloxybenzene sulfonates. Such (meth)acrylate based water-soluble vinyl copolymers are known, as described, for example, in Japanese Patent Publications Tokkai 1–226757 and 6–206750.

A fluidity drop reducing agent of this invention is added to 100 weight parts of a hydraulic cement composition as described above at a rate of less than 1.5 weight parts, and preferably at a rate of 0.01–1.0 weight parts, such that the weight ratio between the fluidity drop reducing agent and the cement dispersant will be 95/5–2/98, and more preferably 50/50–5/95.

This invention does not impose any particular limitation as to the method or timing of the addition of a fluidity drop reducing agent into a hydraulic cement composition. The addition may be effected by a method of adding the fluidity drop reducing agent as a single water solution or preliminarily mixing it with the cement dispersant to prepare a single liquid and then adding this mixture, but the latter method is considered more advantageous. As for the timing, the addition may be effected with the kneading water when the hydraulic cement composition is mixed and kneaded or after the hydraulic cement composition has been mixed and kneaded.

When a fluidity drop reducing agent of this invention is used, another agent may also be used together, depending on the purpose of the use. Example of such other agent include air entraining agents, antifoaming agents, accelerators, retarders, waterproofing agents and shrinkage reducing agents.

Fluidity drop reducing agents of this invention can be used for hydraulic cement compositions such as cement pastes, cement grouts, mortars and concrete, but they are particularly effective if added to concrete when it is being kneaded with a high-range water-reducing agent or a high-range AE water-reducing agent because the slump loss can be reduced while high fluidity can be maintained and workability and applicability at the construction site can be improved.

EXAMPLES

In order to described the invention and its effects more clearly, test examples are described next but these examples are not intended to limit the scope of the invention. In what follows, "parts" shall mean "weight parts" and "%" shall mean "weigh %" excluding the weight of air.

Part 1 (Synthesis of water-soluble vinyl copolymer as fluidity drop reducing agent)

Test Example 1

Methoxypolyethoxy (p=9) ethyl monomaleate 132 parts (0.251 moles), polypropoxy (r=2) polyethoxy (q=15) ethyl monoallyl ether 210 parts (0.251 moles), 2-mercapto ethanol 8 parts (0.102 moles) and ion exchange water 260 parts were placed inside a flask, the interior of the flask was replaced with nitrogen gas and the temperature of the reaction system was kept at 80° C. by means of a temperature bath. Next, a 10% water solution of ammonium persulfate 30 parts was added to start radical polymerization, and the polymerization reaction was continued for 8 hours. Radical termination was effected by adding 40 parts of a 20% water solution of 2-mercapto ethanol, and a 30% water solution of sodium hydroxide was added further to neutralize it. A cellulose tube membrane was used to filter and remove from the neutralized reaction liquid the remaining catalyst and monomers which have not reacted to obtain dried and refined copolymer with molecular weight 3400 and sulphur content 1.7% having repetition units (shown by Formula 1) formed with methoxypolyethoxy (p=9) ethyl monomaleate and repetition units (shown by Formula 2) formed with polypropoxy (r=2) polyethoxy (q=15) ethyl monoallyl ether at molar ratio of 1/1. Next, this copolymer 300 parts (0.088 moles) and ion exchange water 675 parts were placed inside another flask and the interior of the flask was replaced with nitrogen gas. The temperature of this reaction system was kept at 70° C. by means of a temperature bath. After a 10% water solution of ammonium persulfate 40 parts was added for radical activation of the copolymer, a 20% water solution of sodium methallyl sulfonate 142 parts (0.180 moles) was added to continue the reaction for 2 hours to complete the radical addition reaction. Impurities were removed by filtering as described above from the reaction liquid in which the radical addition reaction was completed to obtain dried and refined water-soluble vinyl copolymer (P-1). This water-soluble vinyl copolymer (P-1) was analyzed by NMR, ICP spectrometry, pyrolysis-gas chromatography, elementary analysis, GPC and titration method and found to be a water-soluble vinyl copolymer with carboxyl value 36, sulphur content 3.3%, containing sodium methoxypolyethoxy (p=9) ethyl monomaleate and polypropoxy (r=2) polyethoxy (q=15) ethyl monoallyl ether at molar ratio of 1/1, and having an end group formed by radical addition of sodium methacryl sulfonate and number average molecular weight 3700.

Test Examples 2, 3, 5, 7 and Comparison Examples 1–3

Water-soluble vinyl copolymers (P-2), (P-3), (P-5), (P-7) and (R-1)-(R-3) were obtained similarly. Their characteristics are shown in Tables 1 and 2.

Test Example 4

Methoxypolyethoxy (p=9) ethyl monomaleate 132 parts (0.251 moles), polypropoxy (r=2) polyethoxy (q=30) ethyl monoallyl ether 376 parts (0.251 moles), 3-mercapto-1,2-propanediol 11 parts (0.102 moles) and ion exchange water 260 parts were placed inside a flask, the interior of the flask was replaced with nitrogen gas and the temperature of the reaction system was kept at 80° C. by means of a temperature bath. Next, a 10% water solution of ammonium persulfate 30 parts was added to start radical polymerization, and the polymerization reaction was continued for 8 hours. Radical termination was effected by adding 55 parts of a 20% water solution of 3-mercapto-1,2-propanediol, and a 30% water solution of sodium hydroxide 33 parts was added further to neutralize it. Impurities were removed from the neutralized reaction liquid as in Test Example 1 to obtain dried and refined copolymer with molecular weight 7400 and sulphur content 0.86% having repetition units (shown by Formula 1) formed with methoxypolyethoxy (p=9) ethyl monomaleate and repetition units (shown by Formula 2) formed with polypropoxy (r=2) polyethoxy (q=30) ethyl monoallyl ether at molar ratio of 1/1. Next, this copolymer 740 parts (0.100 moles) and ion exchange water 675 parts were placed inside another flask, and the interior of the flask was replaced with nitrogen gas. The temperature of this reaction system was kept at 70° C. by means of a temperature bath. After a 10% water solution of ammonium persulfate 60 parts was added for radical activation of the copolymer, a 20% water solution of sodium vinyl sulfonate 208 parts (0.320 moles) was added to continue the reaction for 2 hours to complete the radical addition polymerization. Impurities were removed by filtering as described above from the reaction liquid in which the radical addition polymerization was completed to obtain dried and refined water-soluble vinyl copolymer (P-4). This water-soluble vinyl copolymer (P-4) was analyzed as done in Example 1 and found to be a water-soluble vinyl copolymer with carboxyl value 26 and sulphur content 2.0%, containing sodium methoxypolyethoxy (p=9) ethyl monomaleate and polypropoxy (r=2) polyethoxy (q=30) ethyl monoallyl ether at molar ratio of 1/1, including an end group formed by radical addition polymerization of sodium methacryl sulfonate and having numerical average molecular weight 3700.

Test Example 6 and Comparison Example 4

Water-soluble vinyl copolymers (P-6) and (R-4) were obtained similarly. Their characteristics are shown in Tables 1 and 2.

TABLE 1

| WSVC | #1 Kind a | Kind b | a/b | #2 Kind | #3 Kind | #4 Kind | Amount |
|---|---|---|---|---|---|---|---|
| Test Examples | | | | | | | |
| 1 P-1 | a-1 | b-1 | 1/1 | t-1 | s-1 | c-1 | 2.0 |
| 2 P-2 | a-1 | b-2 | 1/1 | t-2 | s-1 | c-1 | 2.1 |
| 3 P-3 | a-2 | b-1 | 1/1 | t-3 | s-1 | c-2 | 2.1 |
| 4 P-4 | a-1 | b-2 | 1/1 | t-4 | s-1 | c-3 | 3.0 |
| 5 P-5 | a-3 | b-2 | 9/11 | t-1 | s-2 | c-4 | 2.0 |
| 6 P-6 | a-2 | b-3 | 11/9 | t-1 | s-1 | c-5 | 4.0 |
| 7 P-7 | a-2 | b-3 | 11/9 | t-1 | s-1 | c-6 | 2.0 |
| Comparison Examples | | | | | | | |
| 1 R-1 | a-1 | b-1 | 7/3 | t-1 | s-1 | c-1 | 2.0 |
| 2 R-2 | a-1 | b-1 | 3/7 | t-1 | s-1 | c-1 | 2.0 |
| 3 R-3 | a-1 | b-1 | 1/1 | t-1 | s-1 | c-1 | 0.3 |
| 4 R-4 | a-1 | b-1 | 1/1 | t-1 | s-1 | cr-1 | 2.0 |

In Table 1:
WSVC: Water-soluble vinyl copolymer
Kind a: Kind of vinyl monomer forming repetition unit shown by Formula 1
Kind b: Kind of vinyl monomer forming repetition unit shown by Formula 2
a/b: Molar ratio of kinds a and b
Kind (#2): Kind of radical terminator
Kind (#3): Kind of radical initiator for radical activation of radically terminated copolymer
Kind (#4): Kind of monoethylenically unsaturated hydrocarbon monomer substituted by sulfonate group for forming end group
Amount (#4): Moles of monoethylenically unsaturated hydrocarbon monomer substituted by sulfonate group used for one mole of radically activated copolymer
a-1: Sodium methoxypolyethoxy (p=9) ethyl monomaleate
a-2: Sodium methoxypolyethoxy (p=3) ethyl monomaleate
a-3: Sodium phenoxypolyethoxy (p=30) ethyl monomaleate
b-1: Polypropoxy (r=2) polyethoxy (q=15) ethyl monoallyl ether
b-2: Polypropoxy (r=2) polyethoxy (q=30) ethyl monoallyl ether
b-1: Polypropoxy (r=10) polyethoxy (q=40) ethyl monoallyl ether
t-1: 2-mercapto ethanol
t-2: 2-mercapto ethyl acrylate
t-3: 1,2-ethanediol
t-4: 3-mercapto-1,2-propanediol
s-1: Ammonium persulfate
s-2: 2,2'-azobis(2-methyl-N-(2-hydroxyethyl) propionamide)
c-1: Sodium methallyl sulfonate
c-2: Sodium allyl sulfonate
c-3: Sodium vinyl sulfonate
c-4: Sodium isopropenyl sulfonate
c-5: Sodium styrene sulfonate
c-6: Sodium isopropenyl benzene sulfonate
cr-1: Sodium 2-acryloxy ethyl sulfonate

TABLE 2

| | | | #3 | | |
|---|---|---|---|---|---|
| WSVC | #1 | #2 | Molar | Weight % | #4 |
| Test Examples | | | | | |
| 1 P-1 | 1/1 | 3400 | 1.8 | 7.7 | 3700 |
| 2 P-2 | 1/1 | 6400 | 1.7 | 4.0 | 6700 |
| 3 P-3 | 1/1 | 3900 | 1.8 | 6.9 | 4200 |
| 4 P-4 | 1/1 | 7400 | 2.8 | 5.2 | 7800 |
| 5 P-5 | 46/54 | 5800 | 1.8 | 4.7 | 6100 |
| 6 P-6 | 53/47 | 7700 | 3.5 | 9.1 | 8500 |
| 7 P-7 | 53/47 | 7700 | 1.8 | 5.2 | 8100 |
| Comparison Examples | | | | | |
| 1 R-1 | 7/3 | 2900 | 1.8 | 8.9 | 3200 |
| 2 R-2 | 3/7 | 7000 | 1.8 | 3.9 | 7300 |
| 3 R-3 | 1/1 | 30700 | 1.8 | 0.9 | 31000 |
| 4 R-4 | 1/1 | 3400 | 4.3 | 22.7 | 4400 |

In Table 2:
WSVC: Water-soluble vinyl copolymer
1: Molar ratio of repetition units shown by Formulas 1 and 2
2: Number average molecular weight of radically terminated copolymer
3(mole): Mole number of added monoethylenically unsaturated hydrocarbon monomer substituted by sulfonate group forming end group per molecule of water-soluble vinyl copolymer

3(weight %): Weight % of hydrocarbon group substituted by sulfonate group as end group in water-soluble vinyl copolymer

4: Number average molecular weight of water-soluble vinyl copolymer

Comparison Example 5

Methoxypolyethoxy (p=9) ethyl monomaleate 66 parts (0.125 moles), polypropoxy (r=2) polyethoxy (q=15) ethyl monoallyl ether 210 parts (0.251 moles), sodium 2-acrylamide-2-methylpropane sulfonate 29 parts (0.126 moles) and ion exchange water 350 parts were placed inside a flask, the interior of the flask was replaced with nitrogen gas and the temperature of the reaction system was kept at 80° C. by means of a temperature bath. Next, a 10% water solution of ammonium persulfate 30 parts was added to start radical polymerization, and the polymerization reaction was continued for 10 hours for its completion. A 30% water solution of sodium hydroxide 17 parts was added further to neutralize it. Impurities were removed from the neutralized reaction liquid as in Test Example 1 to obtain dried and refined water-soluble vinyl copolymer (R-5). It was analyzed as in Test Example 1 and found to be a water-soluble vinyl copolymer having carboxyl value 23 and sulphur content 5.2%, containing sodium methoxypolyethoxy (p=9) ethyl monomaleate, polypropoxy (r=2) polyethoxy (q=15) ethyl monoallyl ether and sodium 2-acrylamide-2-methylpropane sulfonate at molar ratio of 1/2/1, and having number average molecular weight 9200.

Comparison Example 6

Methoxypolyethoxy (p=9) ethyl monomaleate 132 parts (0.251 moles), polypropoxy (r=2) polyethoxy (q=15) ethyl monoallyl ether 210 parts (0.251 moles), 2-mercapto ethanol 8 parts (0.102 moles) and ion exchange water 260 parts were placed inside a flask, the interior of the flask was replaced with nitrogen gas and the temperature of the reaction system was kept at 80° C. by means of a temperature bath. Next, a 10% water solution of ammonium persulfate 30 parts was added to start radical polymerization, and the polymerization reaction was continued for 12 hours for its completion. A 30% water solution of sodium hydroxide 33 parts was added further to neutralize it. Impurities were removed from the neutralized reaction liquid as in Test Example 1 to obtain dried and refined water-soluble vinyl copolymer (R-6). It was analyzed as in Test Example 1 and found to be a water-soluble vinyl copolymer having carboxyl value 40, containing sodium methoxypolyethoxy (p=9) ethyl monomaleate and polypropoxy (r=2) polyethoxy (q=15) ethyl monoallyl ether at molar ratio of 1/1, and having number average molecular weight 3500.

Comparison Example 7

Maleic anhydride 25 parts (0.254 moles), polypropoxy (r=2) polyethoxy (q=15) ethyl monoallyl ether 210 parts (0.251 moles), and ion exchange water 260 parts were placed inside a flask, the interior of the flask was replaced with nitrogen gas after the mixture was uniformly dissolved and the temperature of the reaction system was kept at 80° C. by means of a temperature bath. Next, a 10% water solution of ammonium persulfate 30 parts was added to start radical polymerization, and the polymerization reaction was continued for 10 hours for its completion. A 30% water solution of sodium hydroxide 70 parts was added further to neutralize it. Impurities were removed from the neutralized reaction liquid as in Test Example 1 to obtain dried and refined water-soluble vinyl copolymer (R-7). It was analyzed as in Test Example 1 and found to be a water-soluble vinyl copolymer having carboxyl value 113, containing sodium maleate and polypropoxy (r=2) polyethoxy (q=15) ethyl monoallyl ether at molar ratio of 1/1, and having number average molecular weight 8000.

Comparison Example 8

Methoxypolyethoxy (p=9) ethyl monomaleate 66 parts (0.125 moles), polypropoxy (r=2) polyethoxy (q=15) ethyl monoallyl ether 210 parts (0.251 moles), methoxypolyethoxy (n=2, n being the repetition number of oxyethylene units) ethyl dimaleate 42 parts (0.124 moles), 2-mercapto ethanol 6 parts (0.077 moles), and ion exchange water 260 parts were placed inside a flask, the interior of the flask was replaced with nitrogen gas and the temperature of the reaction system was kept at 80° C. by means of a temperature bath. Next, a 10% water solution of ammonium persulfate 30 parts was added to start radical polymerization, and the polymerization reaction was continued for 8 hours. Radical termination was effected by adding a 20% water solution of 2-mercapto ethanol 40 parts (0.103 moles), and a 30% water solution of sodium hydroxide 17 parts was added further to neutralize it. Impurities were removed from the neutralized reaction liquid as in Test Example 1 to obtain dried and refined copolymer with molecular weight 3900 and sulphur content 1.5%. Next, this copolymer 300 parts (0.077 moles) and ion exchange water 675 parts were placed inside another flask and the interior of the flask was replaced with nitrogen gas. The temperature of this reaction system was kept at 70° C. by means of a temperature bath. After a 10% water solution of ammonium persulfate 40 parts was added for radical activation of the copolymer, a 20% water solution of sodium methallyl sulfonate 126 parts (0.16 moles) was added to continue the reaction for 2 hours for its completion. Impurities were removed by filtration as described above from the reaction liquid in which the radical addition reaction was completed to obtain dried and refined water-soluble vinyl copolymer (R-8). This water-soluble vinyl copolymer (R-4) was analyzed as done in Example 1 and found to be a water-soluble vinyl copolymer with carboxyl value 20 and sulphur content 2.9%, containing sodium methoxypolyethoxy (p=9) ethyl monomaleate, polypropoxy (r=2) polyethoxy (q=15) ethyl monoallyl ether and methoxypolyethoxy (n=2) ethyl dimaleate at molar ratio of 1/2/1, and having number average molecular weight 4200.

Part 2 (Preparation and evaluation of mortar)

Preparation of Mortar

Ordinary portland cement (specific weight=3.16, Braine value representing the specific surface area of cement=3350) 1000 parts, fine aggregates (sand from Oi River with specific weight=2.62) 2350 parts and water 550 parts, as well as a fluidity drop reducing agent synthesized in Part 1 and a cement dispersant, were sequentially thrown into a Hobart mixer and mixed together to prepare mortar samples. The kinds and amounts of fluidity drop reducing agent and cement dispersant that were used are shown in Table 3.

Evaluation

Flow values of the mortar samples thus prepared were measured immediately after the kneading (t0), 30 minutes later (t30), 60 minutes later (t60) and 90 minutes later (t90) according to JIS-R5201 and the setting time according to JIS-A6204. The results are shown in FIG. 3.

TABLE 3

| | FDRA | | CD | | Ratio | Flow Value (mm) | | | | Setting Time |
|---|---|---|---|---|---|---|---|---|---|---|
| | | | | | | t0 | t30 | t60 | t90 | |
| Test Examples | | | | | | | | | | |
| 8 | P-1 | 0.02 | H-1 | 0.18 | 10/90 | 237 | 240 | 239 | 234 | 505 610 |
| 9 | P-2 | 0.06 | H-1 | 0.24 | 20/80 | 237 | 239 | 239 | 233 | 520 625 |
| 10 | P-3 | 0.15 | H-1 | 0.35 | 30/70 | 237 | 240 | 239 | 235 | 530 635 |
| 11 | P-4 | 0.02 | H-1 | 0.18 | 10/90 | 237 | 240 | 239 | 235 | 490 600 |
| 12 | P-5 | 0.10 | H-1 | 0.15 | 40/60 | 237 | 240 | 239 | 234 | 510 615 |
| 13 | P-6 | 0.05 | H-1 | 0.05 | 50/50 | 237 | 238 | 228 | 225 | 480 590 |
| 14 | P-7 | 0.05 | H-1 | 0.05 | 50/50 | 237 | 237 | 228 | 224 | 485 595 |
| 15 | P-6 | 0.05 | NSF | 0.45 | 10/90 | 236 | 227 | 218 | 212 | 490 600 |
| 16 | P-6 | 0.05 | MSF | 0.45 | 10/90 | 236 | 229 | 220 | 214 | 480 585 |
| Comparison Examples | | | | | | | | | | |
| 9 | R-1 | 0.02 | H-1 | 0.18 | 10/90 | 229 | 210 | 200 | 185 | 575 670 |
| 10 | R-2 | 0.02 | H-1 | 0.18 | 10/90 | 208 | 197 | 183 | 170 | 590 680 |
| 11 | R-3 | 0.02 | H-1 | 0.18 | 10/90 | 225 | 200 | 182 | 172 | 560 655 |
| 12 | R-4 | 0.02 | H-1 | 0.18 | 10/90 | 228 | 207 | 195 | 179 | 550 640 |
| 13 | R-5 | 0.02 | H-1 | 0.18 | 10/90 | 226 | 194 | 182 | 167 | 600 695 |
| 14 | R-6 | 0.02 | H-1 | 0.18 | 10/90 | 228 | 205 | 190 | 177 | 595 680 |
| 15 | R-7 | 0.02 | H-1 | 0.18 | 10/90 | 230 | 207 | 192 | 179 | 550 640 |
| 16 | R-8 | 0.02 | H-1 | 0.18 | 10/90 | 220 | 198 | 185 | 170 | 540 635 |
| 17 | — | — | H-1 | 0.18 | 0/100 | 231 | 207 | 191 | 178 | 505 605 |
| 18 | — | — | NSF | 0.44 | 0/100 | 222 | 170 | 162 | 135 | 475 570 |
| 19 | — | — | MSF | 0.55 | 0/100 | 220 | 155 | 145 | 120 | 460 560 |

In Table 3:
FDRA: Fluidity drop reducing agent (kind and amount)
CD: Cement dispersant (kind and amount)
Amount: Amount by solid component in weight parts used with respect to 100 weight parts of cement
Ratio: Weight ratio between FERA and CD
Setting time: Starting time and ending time (in minutes)
H-1: High-range AE water-reducing agent comprising poly(meth)acrylic acid type water-soluble vinyl copolymer type (Tupol HP-11 produced by Takemoto Yushi Kabushiki Kaisha of Japan
NSF: Salt of high condensate of naphthalene sulfonic acid formaldehyde
MSF: Salt of high condensate of melamine sulfonic acid formaldehyde condensate Part 3 (Preparation and evaluation of concrete)
Preparation of Concrete Ordinary portland cement (specific weight=3.16, Braine value=3350) and fine aggregates (sand from Oi River with specific weight=2.62) and coarse aggregates (crushed stone from Okazaki with specific weight=2.66) were sequentially thrown into a 50-liter pan-type mixer and kneaded for 15 seconds at the mix proportion given in Table 4. Next, the fluidity drop reducing agent synthesized in Part 1 and cement dispersant were mixed in and kneaded together and thrown in with water. The kinds of water-soluble vinyl copolymer serving as fluidity drop reducing agent and of cement dispersant, as well as their amounts used are shown in Table 5. The amount of cement dispersant was selected within the range of 0.1–2.0 weight % by solid component with respect to cement such that the target slump value would be within the range of 18±1 cm. In the mix proportion shown in Table 4, an agent for controlling the amount of air was kneaded in with water such that the target air content in each case would be 4.0–5.0%.

TABLE 4

| Ratio of water/cement (%): | 51 |
|---|---|
| Material per unit volume of concrete (kg/m$^3$): | |
| Cement | 320 |
| Water | 164 |
| Fine aggregates | 876 |
| Coarse aggregates | 963 |

Evaluation

For each sample of concrete, slump value (SV), air quantity (AQ), setting time and compressive strength were measured according respectively to JIS-A1101, JIS-A1128, JIS-A6204 and JIS-A1108 immediately after the kneading (t=0), 30 minutes later (t=30), 60 minutes later (t=60) and 90 minutes later (t=90). The results are shown in Tables 5 and 6. It is clearly shown that the fluidity drop reducing agents and methods according to this invention are capable of reducing the drop in fluidity of hydraulic cement compositions with time without causing setting retardation.

TABLE 5

| | Fluidity drop Reducing agent | | Cement dispersant | | Weight |
|---|---|---|---|---|---|
| | Kind | (Part) | Kind | (Part) | Ratio |
| Test Examples | | | | | |
| 17 | P-1 | 0.02 | H-1 | 0.18 | 10/90 |
| 18 | P-2 | 0.06 | H-1 | 0.24 | 20/80 |
| 19 | P-3 | 0.15 | H-1 | 0.35 | 30/70 |
| 20 | P-4 | 0.02 | H-1 | 0.18 | 10/90 |
| 21 | P-5 | 0.04 | H-1 | 0.18 | 10/90 |
| 22 | P-6 | 0.02 | H-1 | 0.18 | 10/90 |
| 23 | P-7 | 0.02 | H-1 | 0.18 | 10/90 |
| 24 | P-6 | 0.05 | NSF | 0.45 | 10/90 |
| 25 | P-6 | 0.04 | MSF | 0.46 | 8/92 |

TABLE 5-continued

Comparison Examples

| | | | | | |
|---|---|---|---|---|---|
| 20 | R-1 | 0.02 | H-1 | 0.18 | 10/90 |
| 21 | R-2 | 0.02 | H-1 | 0.18 | 10/90 |
| 22 | R-3 | 0.02 | H-1 | 0.18 | 10/90 |
| 23 | R-4 | 0.02 | H-1 | 0.18 | 10/90 |
| 24 | R-5 | 0.02 | H-1 | 0.18 | 10/90 |
| 25 | R-6 | 0.02 | H-1 | 0.18 | 10/90 |
| 26 | R-7 | 0.02 | H-1 | 0.18 | 10/90 |
| 27 | R-8 | 0.02 | H-1 | 0.18 | 10/90 |
| 28 | — | — | H-1 | 0.18 | 0/100 |
| 29 | — | — | NSF | 0.45 | 0/100 |
| 30 | — | — | MSF | 0.46 | 0/100 |

| | t = 0 | | t = 30 | | t = 90 | | Slump |
|---|---|---|---|---|---|---|---|
| | SV (cm) | AQ (%) | SV (cm) | AQ (%) | SV (cm) | AQ (%) | Ratio (%) |

Test Examples

| 17 | 18.5 | 4.6 | 18.1 | 4.4 | 17.8 | 4.3 | 96.2 |
| 18 | 18.3 | 4.7 | 18.0 | 4.5 | 17.5 | 4.3 | 95.6 |
| 19 | 18.4 | 4.8 | 18.2 | 4.6 | 18.0 | 4.3 | 97.8 |
| 20 | 18.7 | 4.5 | 18.4 | 4.4 | 18.2 | 4.3 | 97.3 |
| 21 | 18.6 | 4.7 | 18.3 | 4.3 | 18.0 | 4.3 | 96.8 |
| 22 | 18.4 | 4.5 | 18.0 | 4.2 | 17.7 | 4.3 | 96.2 |
| 23 | 18.4 | 4.5 | 18.0 | 4.2 | 17.6 | 4.3 | 95.7 |
| 24 | 18.7 | 4.7 | 18.0 | 4.5 | 17.5 | 4.3 | 93.6 |
| 25 | 18.4 | 4.8 | 17.8 | 4.6 | 17.3 | 4.3 | 94.0 |

Comparison Examples

| 20 | 18.5 | 4.6 | 16.2 | 4.4 | 13.6 | 4.3 | 73.5 |
| 21 | 18.6 | 4.7 | 14.1 | 4.5 | 10.9 | 4.3 | 58.6 |
| 22 | 18.6 | 4.7 | 14.5 | 4.5 | 11.9 | 4.3 | 64.0 |
| 23 | 18.6 | 4.7 | 15.4 | 4.4 | 13.0 | 4.3 | 70.0 |
| 24 | 18.7 | 4.5 | 15.8 | 4.4 | 12.6 | 4.3 | 67.3 |
| 25 | 18.5 | 4.6 | 14.9 | 4.4 | 12.7 | 4.3 | 68.6 |
| 26 | 18.5 | 4.6 | 14.9 | 4.4 | 12.7 | 4.3 | 68.6 |
| 27 | 18.6 | 4.7 | 14.5 | 4.5 | 11.9 | 4.3 | 64.0 |
| 28 | 18.5 | 4.7 | 16.1 | 4.5 | 13.3 | 4.5 | 71.9 |
| 29 | 18.2 | 4.5 | 12.6 | 4.3 | 9.6 | 4.0 | 52.7 |
| 30 | 18.2 | 4.4 | 13.5 | 4.1 | 10.2 | 4.1 | 55.4 |

Slump ratio: Ratio of slump at t=90 and t=0

TABLE 6

| | Compressive Strength (Kgf/cm$^2$) | | Setting Time (Minute) | |
|---|---|---|---|---|
| | 3 days | 28 days | Start | End |

Test Examples

| 17 | 360 | 465 | 495 | 585 |
| 18 | 354 | 460 | 510 | 600 |
| 19 | 357 | 462 | 505 | 600 |
| 20 | 368 | 480 | 485 | 575 |
| 21 | 365 | 476 | 490 | 580 |
| 22 | 362 | 470 | 510 | 600 |
| 23 | 362 | 468 | 510 | 600 |
| 24 | 370 | 480 | 510 | 600 |
| 25 | 375 | 482 | 505 | 595 |

Comparison Examples

| 20 | 358 | 452 | 565 | 650 |
| 21 | 345 | 445 | 580 | 670 |
| 22 | 355 | 457 | 555 | 645 |
| 23 | 360 | 455 | 540 | 635 |
| 24 | 345 | 442 | 595 | 675 |
| 25 | 347 | 456 | 590 | 660 |
| 26 | 357 | 460 | 540 | 640 |
| 27 | 360 | 460 | 535 | 635 |
| 28 | 359 | 450 | 495 | 585 |
| 29 | 350 | 455 | 465 | 555 |
| 30 | 353 | 449 | 450 | 545 |

What is claimed is:

1. An agent for reducing drop in fluidity of hydraulic cement compositions, said agent comprising water-soluble vinyl copolymers with number average molecular weight of 500–20000 containing in the molecule thereof first repetition units shown by Formula 1 and second repetition units shown by Formula 2 at molar ratio of 3/2–2/3 and a hydrocarbon group substituted by sulfonate group as end group, said Formula 1 being

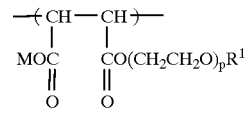

and said Formula 2 being

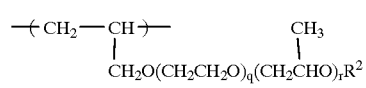

where $R^1$ is alkyl group with 1–3 carbon atoms, phenyl group or benzyl group, $R^2$ is H or $CH_3$, p is an integer 1-50, q is an integer 1-50, r is an integer 1-25, and M is one selected from the group consisting of hydrogen, alkali metals, alkali earth metals, ammonium and organic amines.

2. The agent of claim 1 wherein the number average molecular weight of said water-soluble vinyl polymers is 1000–10000.

3. A method of producing an agent for reducing drop in fluidity of hydraulic cement compositions, said method comprising:

a first step of copolymerizing first vinyl monomer shown by Formula 3 and second vinyl monomer shown by Formula 4 at a molar ratio of 3/2–2/3 in the presence of a radical initiator and thereafter effecting radical termination to obtain a radically terminated copolymer;

a second step of adding a radical initiator to a system containing said radically terminated copolymer to effect radical activation said radically terminated copolymer; and a third step of obtaining water-soluble vinyl copolymers with number average molecular weight of 500–20000 having hydrocarbon group substituted by sulfonate group as end group by causing radical addition or radical addition polymerization of monoethylenically unsaturated hydrocarbon monomer substituted by sulfonate group to said radically activated copolymer, said Formula 3 being

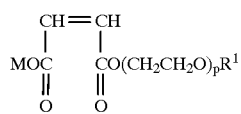

and said Formula 4 being

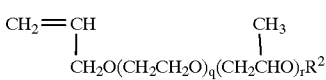

where $R^1$ is alkyl group with 1–3 carbon atoms, phenyl group or benzyl group, $R^2$ is H or $CH_3$, p is an integer 1-50, q is an integer 1-50, r is an integer 1-25, and M is one selected from the group consisting of hydrogen, alkali metals, alkali earth metals, ammonium and organic amines.

4. The method of claim 3 wherein the number average molecular weight of said water-soluble vinyl polymers is 1000–10000.

5. The method of claim 4 wherein said radical termination in said first step is effected by adding a compound which has a total of at least two hydroxyl and thiol groups in the molecule thereof.

6. The method of claim 4 wherein said radical termination in said first step is effected by adding a compound which has thiol group and α,β-ethylenically unsaturated hydrocarbon group.

7. The method of claim 4 wherein said radical initiator added in said second step is an azobis compound which has a hydroxyl group in the molecule thereof.

8. The method of claim 4 wherein allyl sulfonate, methallyl sulfonate or both allyl sulfonate and methallyl sulfonate are used as said monoethylenically unsaturated hydrocarbon monomer substituted by sulfonate group in said third step.

9. The method of claim 4 wherein one or more selected from the group consisting of vinyl sulfonates, isopropenyl sulfonates, styrene sulfonates and isopropylbenzene sulfonates are used as said monoethylenically unsaturated hydrocarbon monomer substituted by sulfonate group in said third step.

10. A method of reducing a drop in fluidity of a hydraulic cement composition containing cement, aggregates, a cement dispersant and water, said method comprising the step of adding to 100 weight parts of said hydraulic cement composition 1.5 weight parts or less of water-soluble vinyl copolymers with number average molecular weight 500–20000 having first repetition units shown by Formula 1 and second repetition units shown by Formula 2 within the molecule thereof at a molar ratio of 3/2–2/3 and hydrocarbon group substituted by sulfonate group as an end group, such that the weight ratio between said water-soluble vinyl copolymer and said cement dispersant is 95/5–2/98, said Formula 1 being

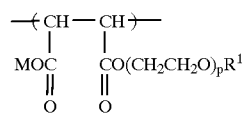

and said Formula 2 being

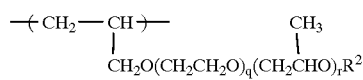

where $R^1$ is alkyl group with 1-3 carbon atoms, phenyl group or benzyl group, $R^2$ is H or $CH_3$, p is an integer 1-50, q is an integer 1-50, r is an integer 1-25, and M is one selected from the group consisting of hydrogen, alkali metals, alkali earth metals, ammonium and organic amines.

11. The method of claim 10 wherein the number average molecular weight of said water-soluble vinyl polymers is 1000–10000.

12. The method of claim 11 wherein said water-soluble vinyl copolymer is produced by a process including:

a first step of copolymerizing first vinyl monomer shown by Formula 3 and second vinyl monomer shown by Formula 4 at a molar ratio of 3/2–2/3 in the presence of a radical initiator and thereafter effecting radical termination to obtain a radically terminated copolymer;

a second step of adding a radical initiator to a system containing said radically terminated copolymer to effect radical activation of said radically terminated copolymer; and a third step of obtaining water-soluble vinyl copolymers with number average molecular weight of 500–20000 having hydrocarbon group substituted by sulfonate group as end group by causing radical addition or radical addition polymerization of monoethylenically unsaturated hydrocarbon monomer substituted by sulfonate group to said radically activated copolymer, said Formula 3 being

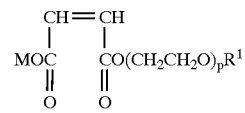

and said Formula 4 being

13. The method of claim 12 wherein said radical termination in said first step is effected by adding a compound which has a total of at least two hydroxyl and thiol groups in the molecule thereof.

14. The method of claim 12 wherein said radical termination in said first step is effected by adding a compound which has thiol group and α,β-ethylenically unsaturated hydrocarbon group.

15. The method of claim 12 wherein said radical initiator added in said second step is an azobis compound which has a hydroxyl group in the molecule thereof.

16. The method of claim 12 wherein allyl sulfonate, methallyl sulfonate or both allyl sulfonate and methallyl sulfonate are used as said monoethylenically unsaturated hydrocarbon monomer substituted by sulfonate group in said third step.

17. The method of claim 12 wherein one or more selected from the group consisting of vinyl sulfonates, isopropenyl sulfonates, styrene sulfonates and isopropylbenzene sulfonates are used as said monoethylenically unsaturated hydrocarbon monomer substituted by sulfonate group in said third step.

* * * * *